(12) United States Patent
Grancharov et al.

(10) Patent No.: US 12,361,642 B2
(45) Date of Patent: Jul. 15, 2025

(54) THREE-DIMENSIONAL MODELING

(71) Applicant: Telefonaktiebolaget LM Ericsson (publ), Stockholm (SE)

(72) Inventors: Volodya Grancharov, Solna (SE); Manish Sonal, Sollentuna (SE); Steven Combes, Worthing (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 18/024,145

(22) PCT Filed: Sep. 2, 2020

(86) PCT No.: PCT/EP2020/074455
§ 371 (c)(1),
(2) Date: Mar. 1, 2023

(87) PCT Pub. No.: WO2022/048741
PCT Pub. Date: Mar. 10, 2022

(65) Prior Publication Data
US 2023/0267682 A1   Aug. 24, 2023

(51) Int. Cl.
*G06T 17/05* (2011.01)
*G06T 7/00* (2017.01)
*G06T 7/73* (2017.01)

(52) U.S. Cl.
CPC ........... *G06T 17/05* (2013.01); *G06T 7/73* (2017.01); *G06T 7/97* (2017.01); *G06T 2200/04* (2013.01); *G06T 2207/10028* (2013.01); *G06T 2207/10032* (2013.01); *G06T 2207/30184* (2013.01); *G06T 2207/30244* (2013.01)

(58) Field of Classification Search
None
See application file for complete search history.

(56) References Cited

PUBLICATIONS

Joint 2-D-3-D traffic sign landmark data set for geo-localization using mobile laser scanning data. IEEE Transactions on Intelligent Transportation Systems 20.7 (2018): 2550-2565 (Year: 2018).*

(Continued)

*Primary Examiner* — Nurun Flora
(74) *Attorney, Agent, or Firm* — Rothwell, Figg, Ernst & Manbeck, P.C.

(57) ABSTRACT

A method (1200) for producing a reduced point cloud comprising an object of interest (OOI) from an original point cloud comprising the OOI. The method includes obtaining (s1202) the original point cloud; obtaining (s1204) a set of N images, each of the N images comprising an image of the OOI from a unique position relative to the OOI; for each one of the N images, defining (s1206) an area of interest in the image that obtaining a set of N images, each of the N images that includes the OOI, thereby defining N areas of interest; for each point included in the original point cloud, determining (s1208), for each one of the N areas of interest, whether the point is located in the area of interest; for each point included in the original point cloud, determining (s1210) a first metric for the point based on the total number of the N areas of interest in which the point is determined to be located; and for each point included in the set of points, determining (s1212) whether or not to include the point in the reduced point cloud based on the first metric for the point.

19 Claims, 13 Drawing Sheets

(56) References Cited

PUBLICATIONS

International Search Report and Written Opinion with Transmittal issued in International Application No. PCT/EP2020/074455 dated May 12, 2021 (15 pages).

You, C., et al., "Joint 2-D-3-D Traffic Sign Landmark Data Set for Geo-Localization Using Mobile Laser Scanning Data", IEEE Transactions on Intelligent Transportation Systems, vol. 20, No. 7, Jul. 1, 2019, IEEE, Piscataway, NJ, USA, XP011732322 (16 pages).

* cited by examiner

THREE-DIMENSIONAL MODELING

CROSS REFERENCE TO RELATED APPLICATIONS

This application is a 35 U.S.C. § 371 National Stage of International Patent Application No. PCT/EP2020/074455, filed on Sep. 2, 2020.

TECHNICAL FIELD

Disclosed are embodiments related to producing a reduced point cloud comprising an object of interest (OOI) from an original point cloud comprising the OOI.

BACKGROUND

An unmanned aerial vehicle (UAV) (a.k.a., "drone") equipped with a camera can be used to obtain images of a telecommunications cell tower (or other OOI) and these images can then be used to generate a three-dimensional (3D) model of the cell tower.

SUMMARY

Certain challenges presently exist. For instance, the task of generating a 3D model (e.g., a 3D point cloud) of a cell tower based on images captured using drone is non-trivial. The best-known solution is to perform a 360° orbit above the tower and collect consecutive images with about an 80% overlap. Since 3D modeling relies on stable ground landmarks, images are taken with a down tilt of around 45-60° on the camera (i.e., low oblique imagery, where horizon is not visible). A problem with this solution is that the resulting point cloud captures a large part of a scene surrounding the cell tower. Because such a resulting point cloud may consist of tens of millions of points, it is challenging to automatically extract from the point cloud the points belonging to the cell tower, as opposed to other points belonging to, for example, background object or the ground.

In one aspect there is provided a method for producing a reduced point cloud comprising an OOI from an original point cloud comprising the OOI. The method includes obtaining the original point cloud and obtaining a set of N images, each of the N images comprising an image of the OOI from a unique position relative to the OOI. The method also includes, for each one of the N images, defining an area of interest in the image that includes the OOI, thereby defining N areas of interest. The method also includes, for each point included in the original point cloud, determining, for each one of the N areas of interest, whether the point is located in the area of interest. The method also includes, for each point included in the original point cloud, determining a first metric for the point based on the total number of the N areas of interest in which the point is determined to be located, and for each point included in the set of points, determining whether or not to include the point in the reduced point cloud based on the first metric for the point.

In another aspect there is provided a computer program comprising instructions. When the instructions are executed by processing circuitry of a modeling apparatus, the instructions cause the modeling apparatus to perform the above described method for producing a reduced point cloud comprising an OOI from an original point cloud comprising the OOI. In one embodiment, there is provided a carrier containing the computer program, wherein the carrier is one of an electronic signal, an optical signal, a radio signal, and a computer readable storage medium.

In another aspect there is provided a modeling apparatus for producing a reduced point cloud comprising an OOI from an original point cloud comprising the OOI. The modeling apparatus is configured to obtain the original point cloud and obtain a set of N images, each of the N images comprising an image of the OOI from a unique position relative to the OOI. The modeling apparatus is also configured to, for each one of the N images, define an area of interest in the image that includes the OOI, thereby defining N areas of interest (e.g., N BBs). The modeling apparatus is also configured to, for each point included in the original point cloud, determine, for each one of the N areas of interest, whether the point is located in the area of interest. The modeling apparatus is also configured to, for each point included in the original point cloud, determine a first metric for the point based on the total number of the N areas of interest in which the point is determined to be located, and for each point included in the set of points, determine whether or not to include the point in the reduced point cloud based on the first metric for the point.

In another aspect there is provided a modeling apparatus for producing a reduced point cloud comprising an OOI from an original point cloud comprising the OOI, where the modeling apparatus includes processing circuitry and a memory. The memory contains instructions executable by the processing circuitry, whereby the modeling apparatus is operative to perform the methods disclosed herein, such as the above described method for producing a reduced point cloud comprising an OOI from an original point cloud comprising the OOI.

The embodiments disclosed herein are advantageous in that, with respect to the modelling of telecommunication equipment (e.g., a cell tower) the embodiments provide a more accurate site design and installation documentation, site implementation document (SID), Bill of Materials (BoM), etc.

BRIEF DESCRIPTION OF THE DRAWINGS

The accompanying drawings, which are incorporated herein and form part of the specification, illustrate various embodiments.

DETAILED DESCRIPTION

This disclosure focuses on a use case in which the object of interest (OOI) is a piece of telecommunication equipment (e.g., a cell tower). This disclosure, however, is applicable to any use case.

High Level Architecture

Figure 1:
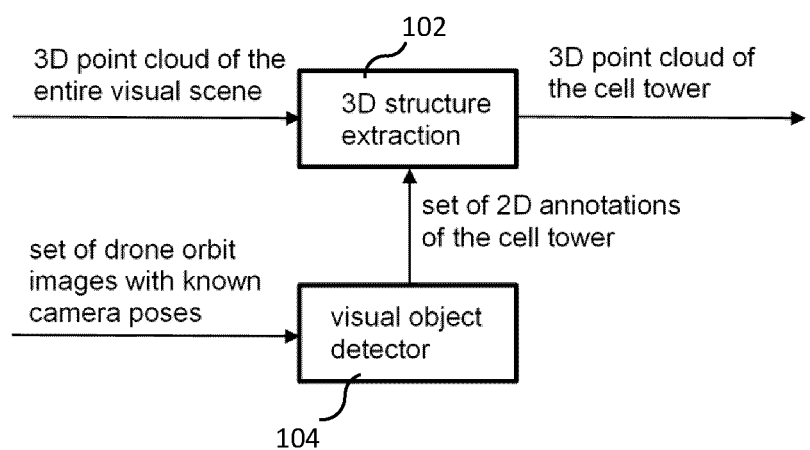
FIG. 1 illustrates a block diagram of a system according to some embodiments.

FIG. 1 illustrates a high-level functional block-diagram of a system 100 according to an embodiment.. Advantageously, system 100 is configured to automatically extract relevant points from an original point cloud thereby producing a reduced point cloud (e.g., extracting from the original point cloud points corresponding to an OOI, thereby producing a reduced point cloud that includes the points corresponding to the OOI, but does not include non-relevant points). In one specific embodiment, the system 100 performs a process that includes: 1) utilizing a bounding box (BB) level visual object detector operating on set of 2D images with known camera intrinsic and extrinsic parameters, 2) associating points from the point cloud with image pixels by projecting the points in the point cloud to the image planes, and 3) automatic background and ground filtering in the point cloud. Camera intrinsic parameters include the focal length and principal point. Camera extrinsic parameters include camera poses, which is position and orientation of the camera in the point cloud coordinate system.

Figure 2:
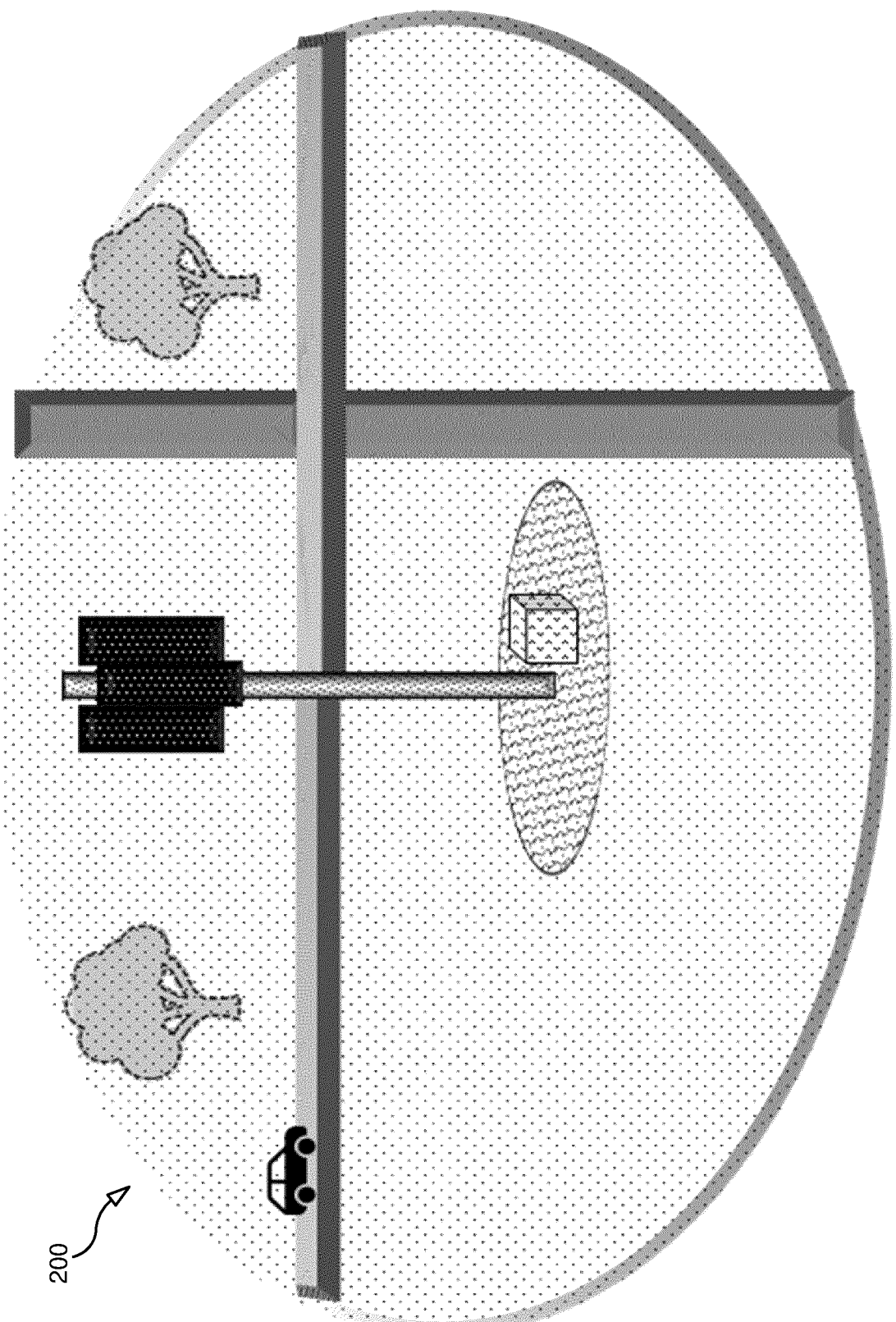
FIG. 2 illustrates an example input point cloud.

As shown in FIG. 1, in one embodiment system 100 includes a 3D structure extraction unit 102 and a visual object detector unit 104. A first input to the 3D structure extraction unit 102 is an input point cloud 200 (see FIG. 2). The input point cloud 200 could be stored and transferred in popular formats like LAS, PLY, XYZ, etc. The most popular approach for generating this input point cloud 200 is to use Structure from Motion (SfM) technology (e.g., SfM technology from Pix4D (www.pix4d.com), COLMAP (see colmap.github.io/), etc.). These methods use consecutive images, generated according to the process illustrated in FIG. 3.

Figure 3:
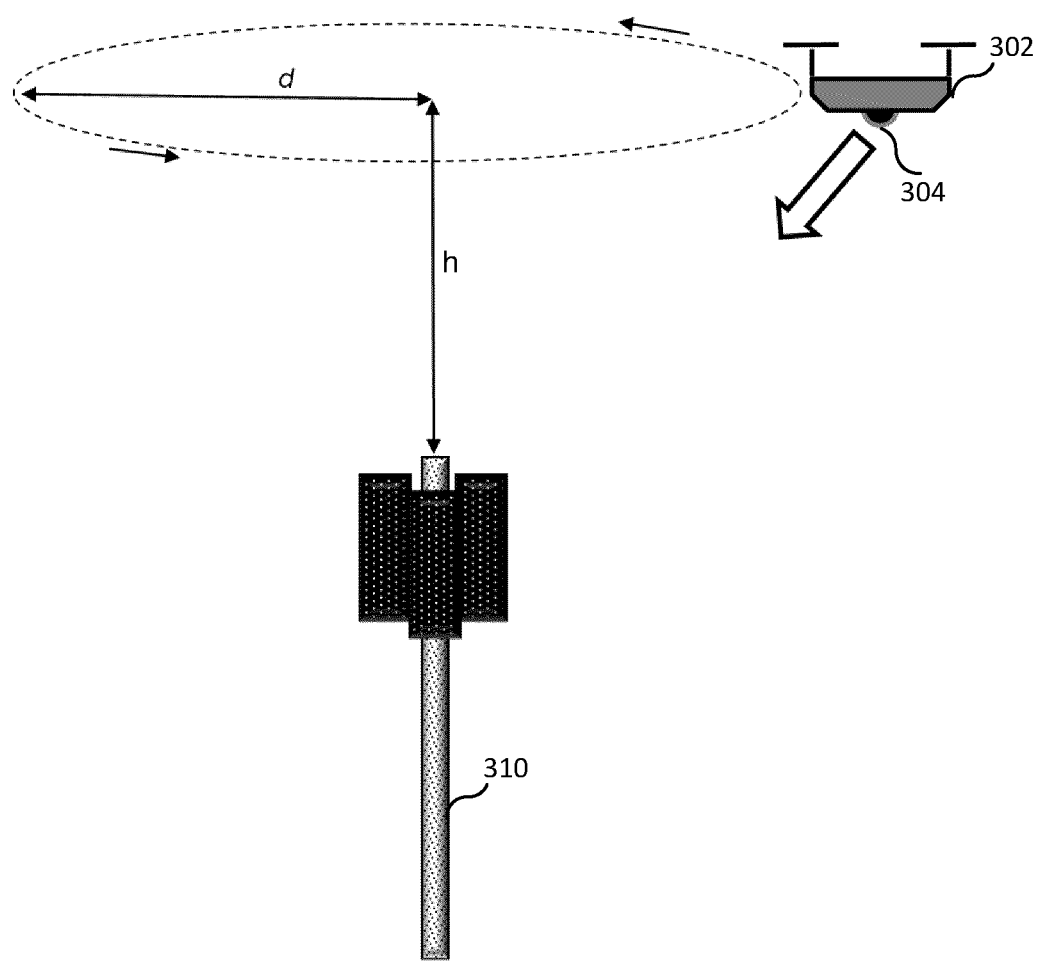
FIG. 3 illustrates an image acquisition process.

As shown in FIG. 3 images are collected using a drone 302 equipped with a camera 304. As shown in FIG. 3, drone 302 orbits cell tower 310, where the orbit has a diameter of d (e.g., d is 30 to 40 meters), and at various different points on the orbital path (e.g., 80 to 160 different points on the orbital path) the camera takes an image (thus, generally, 80 to 160 images are obtained). The drone is positioned a distance h from the top of the tower 310 (in some embodiments h=d) and the camera 304 points down at 45-60 degrees. Each image taken by the camera 304 captures the entire cell tower 310 from top to bottom.

Figure 4:
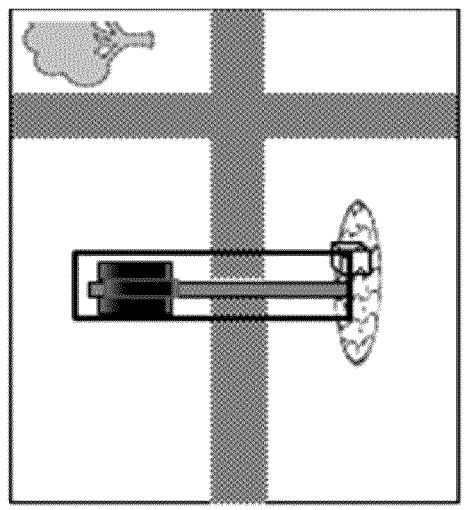
FIG. 4 illustrates three images and a BB for each image.
Figure 4:
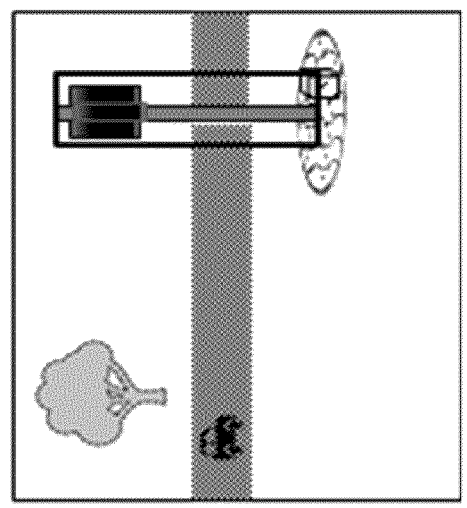
Figure 4:
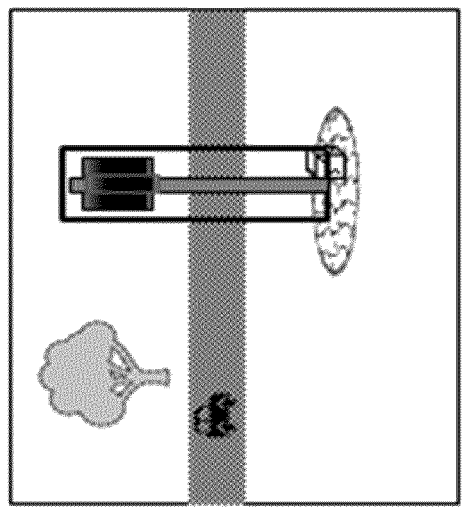

An input to visual object detector unit 104 is a set of N (N>1) drone orbit images with "known camera poses." These images could be a subset of the images used to generate the input point cloud 200 or these images could be a set of images resulting from an additional scan of the cell tower. "Known camera poses" means that these images are registered to the point cloud, that is, for each of the N images, the camera's location and orientation are known in the point cloud's coordinate system. Visual object detector unit 104 could be an off-the-shelf detector (e.g., YOLOv4 (available at github.com/AlexeyAB/darknet), Faster R-CNN (available at github.com/rbgirshick/py-faster-rcnn), etc.) with a custom model for detecting the cell tower on a bounding box (BB level) (see, e.g., FIG. 4). The detection model is trained on a set of manually annotated drone images with cell tower present in the visual scene.

Visual object detector unit 104 is configured to output a set of N 2D annotations of the cell tower. The set of N 2D annotations produced by visual object detector unit 104 could be as an example in YOLO format:

$$BB \stackrel{\text{def}}{=} [C_u, C_v, W, H], \qquad (Eq. 1)$$

where $C_u$ and $C_v$ are coordinates of the center of the BB (in image coordinate system [u, v]), as well as, the width W and the height H of the BB in pixels.

In addition to the classical 2D image analysis, the visual object detector unit 104 might take advantage of domain specific additional information such as, for example: 1) drone orbit geometry defined by poses of 2D images in the point cloud coordinate system, 2) orientation of the drone camera during the image acquisition defined by the angles yaw, pitch, roll, and 3) geolocation information provided by the drone. In any case, the output of visual object detector unit 104 includes image information (e.g., set of coordinates in the 2D image plane) for each image, the image information for each image comprising information indicating or specifying an area (e.g., BB) encompassing the cell tower and camera pose information for the image.

Figure 5:
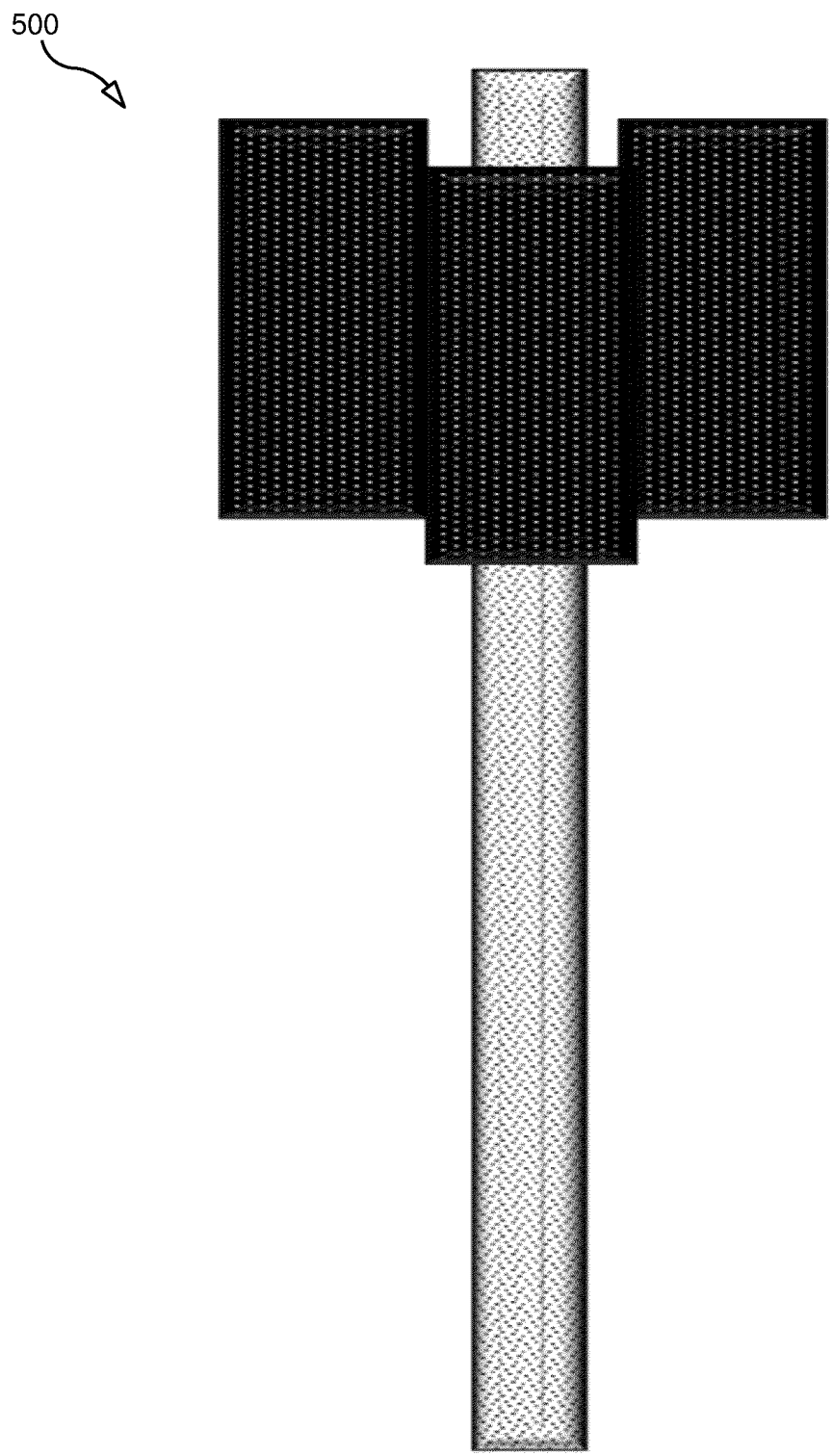
FIG. 5 illustrates a reduced point cloud.

This image information output from visual object detector unit 104 is another input to 3D structure extraction unit 102. 3D structure extraction unit 102 uses the input point cloud 200 and the image information for each of the images provided by visual object detector unit 104 to extract the most relevant subset of points from the point cloud (i.e., the points from the input point cloud 200 that correspond to the cell tower), thereby forming a reduced point cloud 500 (see FIG. 5) that includes the OOI (i.e., the cell tower) (that is, the reduced point cloud includes the most relevant points of the input point cloud 200—i.e., the points corresponding to the OOI ). Advantageously, however, this reduced point cloud 500 is much smaller than the input point cloud 200 as non-relevant points from the input point cloud 200 are not included in the reduced point cloud 500. FIG. 5 illustrates the reduced point cloud 500 and by comparing the point cloud shown in FIG. 5 (reduced point cloud 500) to point cloud shown in FIG. 2 (input point cloud 200) one can see that the reduced point cloud 500 includes the OOI, the cell tower in this example, but reduced point cloud 500 has fewer points than the input point cloud 200. That is, reduced point cloud 500 contains all of the relevant points (i.e., the points corresponding to the cell tower), but has fewer points than the input point cloud 200.

Advantageously, the reduced point cloud 500 can be used in a process for generating a computer-aided design (CAD) model of the cell tower using tools such as, for example, 3D Systems Geomagic® software (see www.3dsystems.com), or replacing certain tower components (antennas, remote radio units (RRUs), etc.) with existing CAD models.

Detailed Steps

Figure 6:
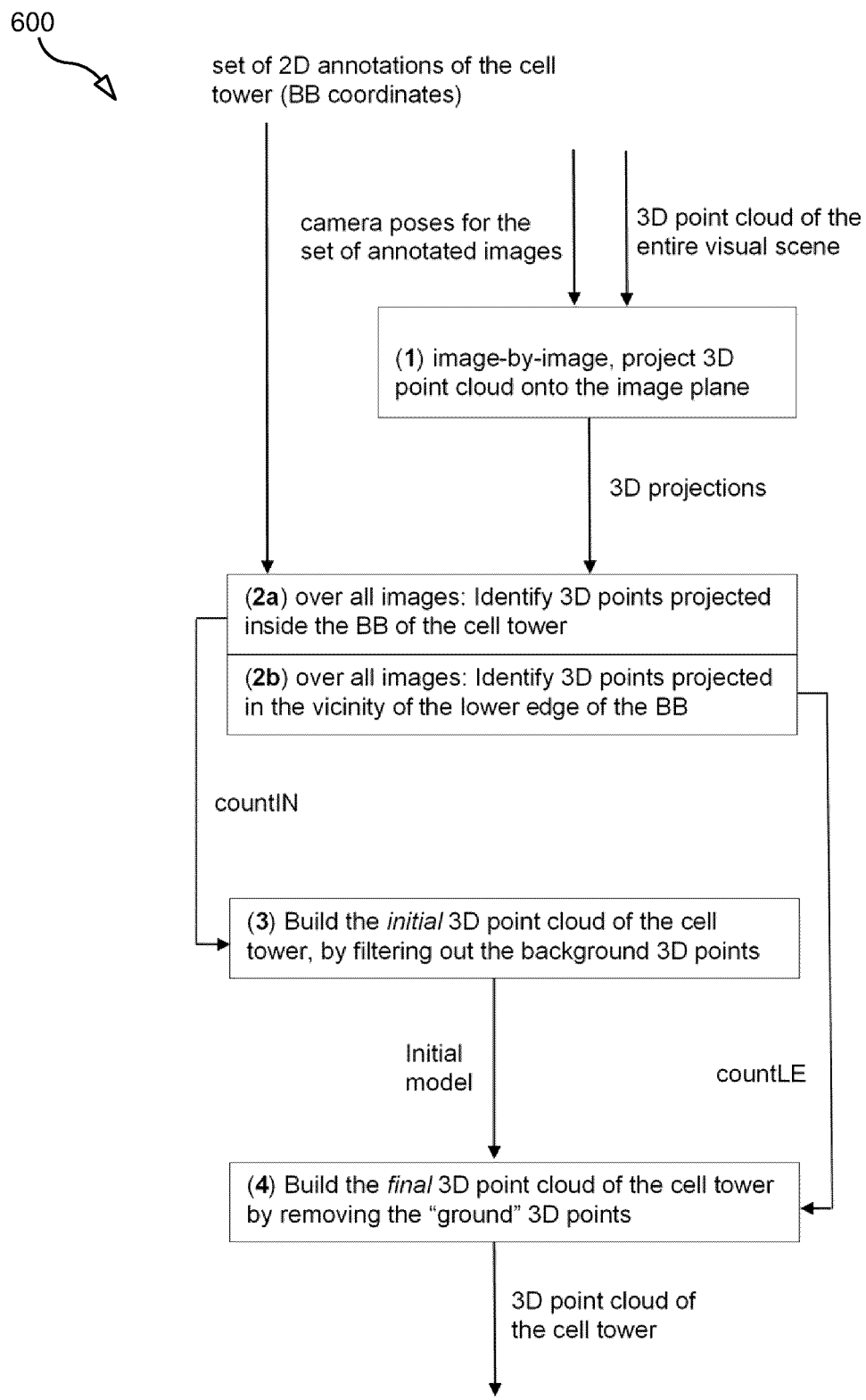
FIG. 6 is a process flow diagram illustrating a process according to an embodiment.

FIG. 6 is a process flow diagram illustrating a process 600, according to an embodiment, that is performed by 3D structure extraction unit 102. Process 600 begins with step 1.

In step 1, for each of the N images, 3D structure extraction unit 102 uses the camera pose information for the image to project all of the points from the input point cloud 200 onto the image plane for the image. This is a many-to-one mapping operation because multiple points in the input point cloud 200 can get projected to the same point in the image plane of the image. This is conceptually different from projecting a 3D surface (rejecting occluded points, behind other points) onto the image plain and establishing correspondence between projected points and image pixels. In the projection operation used herein, even occluded points from the input point cloud 200 (for example points from the front panel as well as points from on the back of the antenna) are projected onto the image plain of the image.

The camera pose in the point cloud coordinate system is defined by the position CP=[$CP_x$, $CP_y$, $CP_z$] and orientation angles [ω, φ, τ], which define a rotation matrix R as:

$$R = \begin{pmatrix} 1 & 0 & 0 \\ 0 & \cos(\omega) & -\sin(\omega) \\ 0 & \sin(\omega) & \cos(\omega) \end{pmatrix} \begin{pmatrix} \cos(\varphi) & 0 & \sin(\varphi) \\ 0 & 1 & 0 \\ -\sin(\varphi) & 0 & \cos(\varphi) \end{pmatrix} \begin{pmatrix} \cos(\tau) & -\sin(\tau) & 0 \\ \sin(\tau) & \cos(\tau) & 0 \\ 0 & 0 & 1 \end{pmatrix}$$ (Eq. 2)

Then a point (P, P=[X,Y,Z]) in the input point cloud 200 is projected in the camera coordinate system by: $P^* = R^T(P-CP)$, where $R^T$ is the transpose of R. Because point P has three coordinates (X, Y, and Z) point P may be referred to as a 3D point. That is, each point in input point cloud 200 is a 3D point.

Next $P^* = [X^*, Y^*, Z^*]$ is converted into 2D image coordinates [$u^*, v^*$] as:

$$[u^*, v^*] = \left[-f\frac{X^*}{Z^*}, -f\frac{Y^*}{Z^*}\right] + [s_x, s_y],$$ (Eq. 3)

where f is the focal of the camera, and [$s_x$, $s_y$] are intrinsic camera parameters (i.e., principal points). Note that [$u^*, v^*$] are in the image coordinate system but are not integers and in the general case end up in between the integer grid of image pixels.

Figure 7:
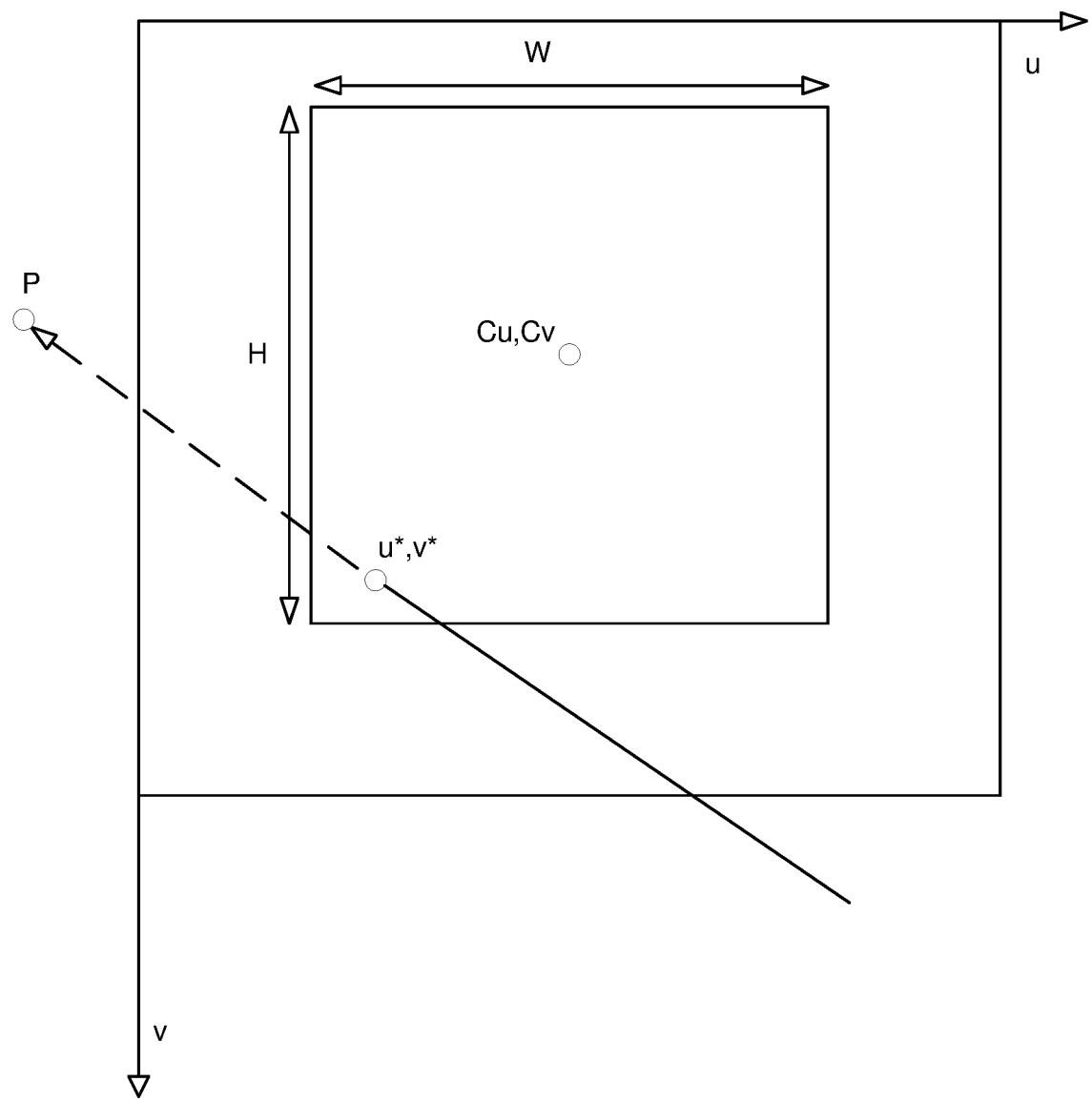
FIG. 7 illustrates a projected point u*,v* that is within a BB for an image.

In step 2a, for the $n^{th}$ image, 3D structure extraction unit 102 checks which of the projected points (all M points, indexed as m=1:M) are inside the BB of the cell tower (see, e.g., FIG. 7). For example, the following logic may be used to determine whether the $m^{th}$ point in the input point cloud 200 is located within the BB for the $n^{th}$ image:

--- if $\left(|C_u(n) - u^*(m)| \leq \frac{W(n)}{2}\right.$ and $\left.|C_v(n) - v^*(m)| \leq \frac{H(n)}{2}\right)$ {

$m^{th}$ point inside BB of $n^{th}$ image;
    $countIN_m = countIN_m + 1$;
}
else
    the point is not within the BB

---

When applied to all N images from the drone orbit (n=1: N), the above per-image operation for the $m^{th}$ point of the input point cloud 200 allows one to determine the total number of BBs in which the $m^{th}$ point is "located," and this is stored in the variable $countIN_m$. This process is then performed for each point in the input point cloud 200, thereby obtaining a countIN value for each one of the points in the input point cloud 200.

Figure 8:
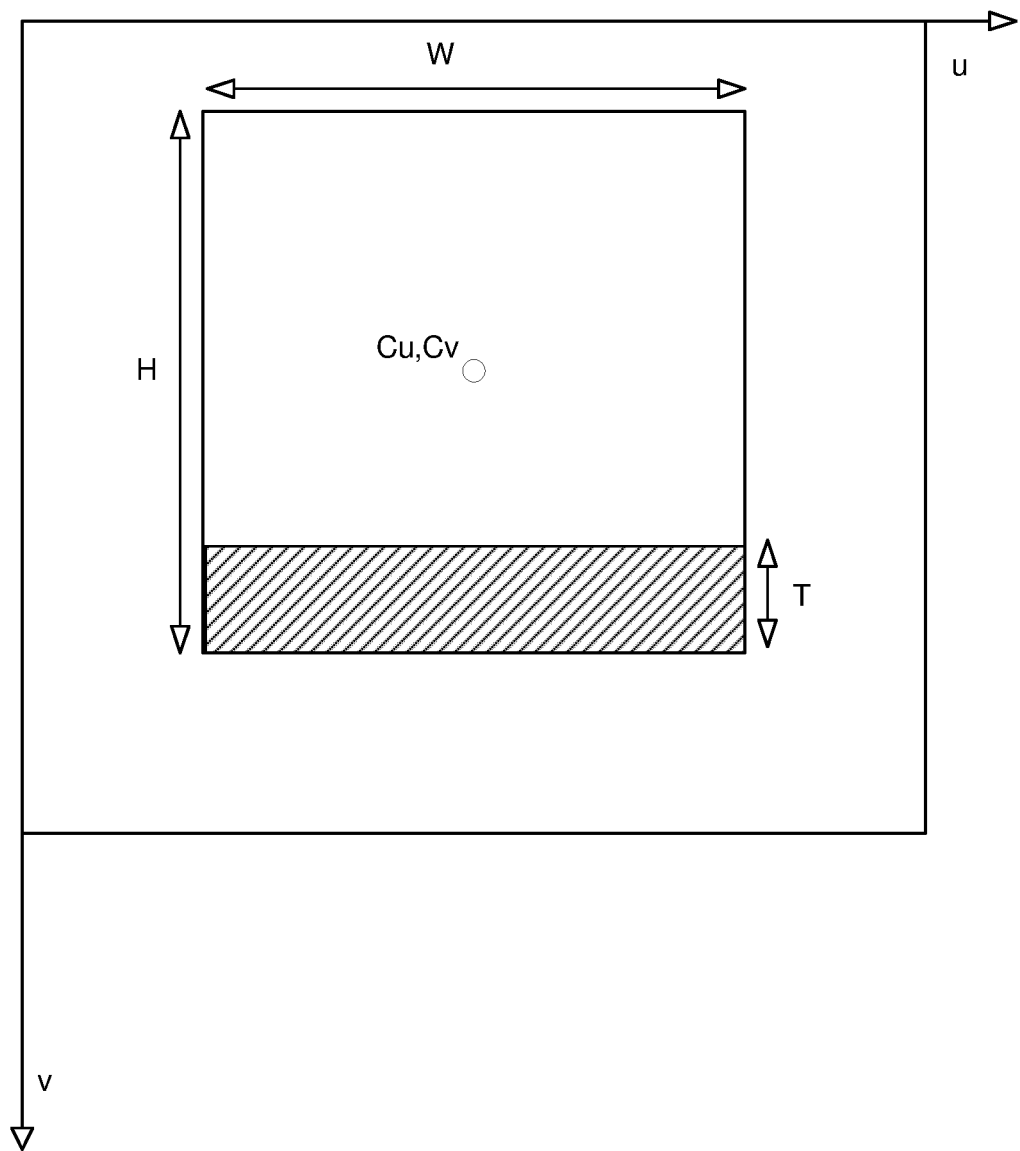
FIG. 8 illustrates an area adjacent to the lower edge of a BB for an image.

In step 2b, for the $n^{th}$ image, 3D structure extraction unit 102 checks which of the points that are "located" within the BB (i.e., projected in the BB) for the nth image are "located" within the vicinity of the lower edge of the BB (see e.g., FIG. 8). The vicinity of the lower edge may be defined as T pixels above the lower edge (e.g., T=2, 3 or 4), as shown in FIG. 8. This means that one can identify set of points in the area T×W, as illustrated in FIG. 8. For example, the following logic may be used to determine whether the $m^{th}$ point in the input point cloud 200 is located (projected) within the vicinity of the lower edge of the BB for the $n^{th}$ image (assuming that this $m^{th}$ point is located within the BB):

--- if $\left(|C_v(n) - v^*(m)| > \left(\frac{H(n)}{2} - T\right)\right)$

{
    $m^{th}$ point at lower edge of $n^{th}$ image;
    $countLE_m = countLE_m + 1$;
}
else
    the point is not at the lower edge

---

The variable countLEm allows one to identify a unique set of points which are then used to determine the ground plane below the cell tower.

The table below illustrates the data that is obtained for each of the points in the input point cloud 200. The table consists of M rows, each row containing: a point ID identifying a unique point in the input point cloud 200, the point's spatial coordinates (X, Y, Z), the number of times the point is "seen" inside a BB (countINm), and the numbers of times the point is "seen" at the lower edge of a BB (countLEm). Given that we have N images from the drone orbit, the variables countINm and countLEm are in the range [0-N] and countLEm is always equal or less than countINm.

| $ID_1$ | $X_1$ | $Y_1$ | $Z_1$ | $countIN_1$ | $countLE_1$ |
|---|---|---|---|---|---|
| $ID_2$ | $X_2$ | $Y_2$ | $Z_2$ | $countIN_2$ | $countLE_2$ |
| ... | ... | ... | ... | ... | ... |
| $ID_M$ | $X_M$ | $Y_M$ | $Z_M$ | $countIN_M$ | $countLE_M$ |

Figure 11:
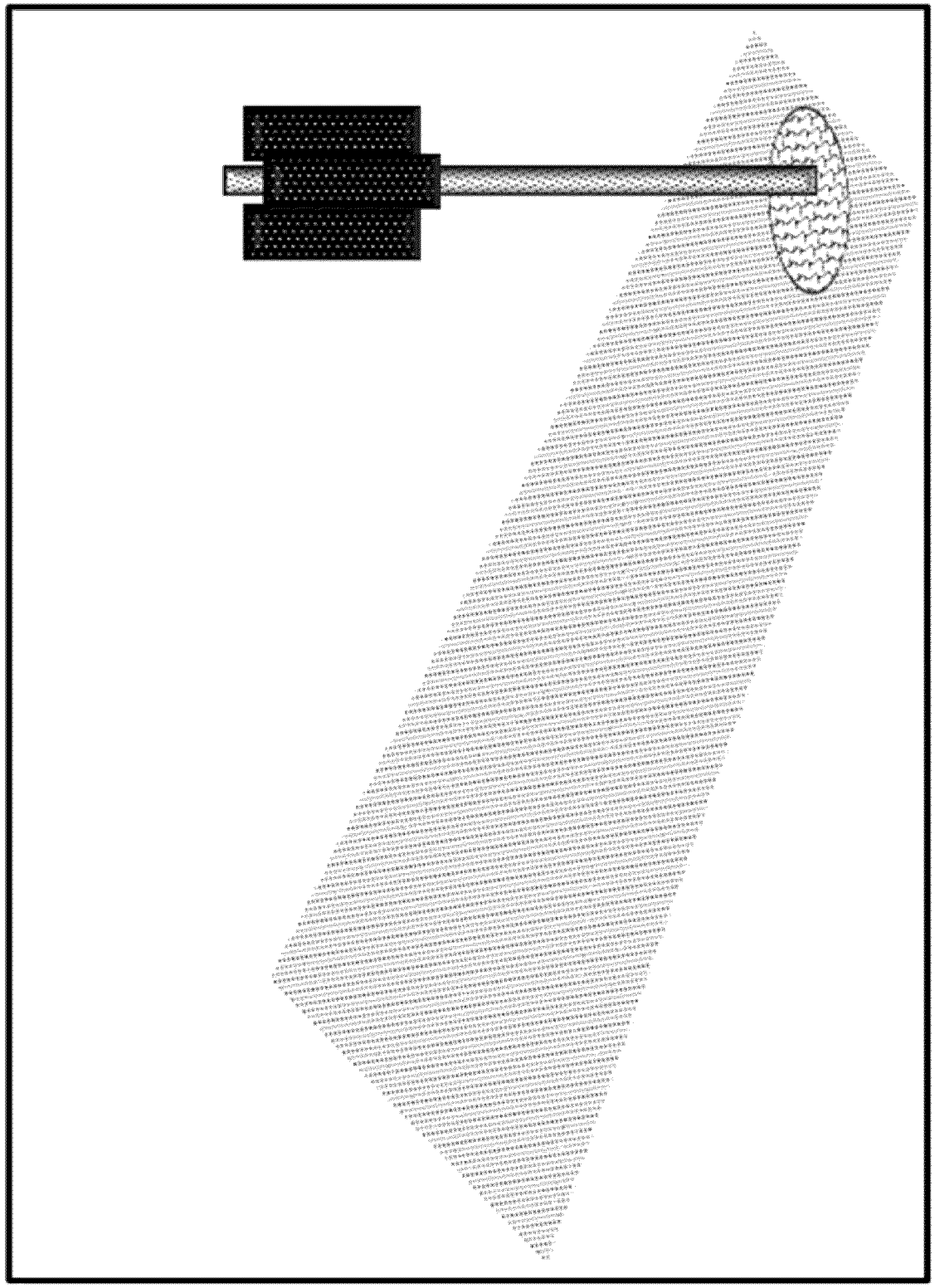
FIG. 11 illustrates a set of points from an input point cloud that have been determined to be "located" within the BB for one of the N images.

The logic behind the above table is that over the set of N images, each BB will capture both points that belong to the cell tower and points from the background. Still, as the drone orbits and "sees" the tower from different angles, some points will be almost always in the bounding box area (cell tower points), while the points that belong to the background, from some angle will be seen outside the bounding box (see, e.g., FIG. 11). FIG. 11 illustrates the set of points from the input point cloud 200 that have been determined to be "located" within the BB for one of the N images (i.e., the points' projected points are within the BB). As illustrated in FIG. 11 there is a large number of points that belong to the ground behind the tower. The concept used to remove these points is to "see" the tower from many angles. From every angle the drone "sees" different sets of "background" points, but always the same set of points that belong to the tower.

The fact that countIN will be significantly higher for points that belong to the cell tower is used by 3D structure extraction unit 102 to filter out part of the point cloud 200 that does not belong to the tower (see step 3). Given the number of drone images N, the countIN value, and a threshold β(e.g., β=0.85), the logic for determining whether or not a point belongs to the background can be implemented as loop over all points, m=1: M as shown in the table below:

---

```
if ( countINm/N < β )
   the m^th point (i.e., the point identified
   by IDm) belongs to the background
else
   the m^th point belongs to the cell tower
```

Figure 9:
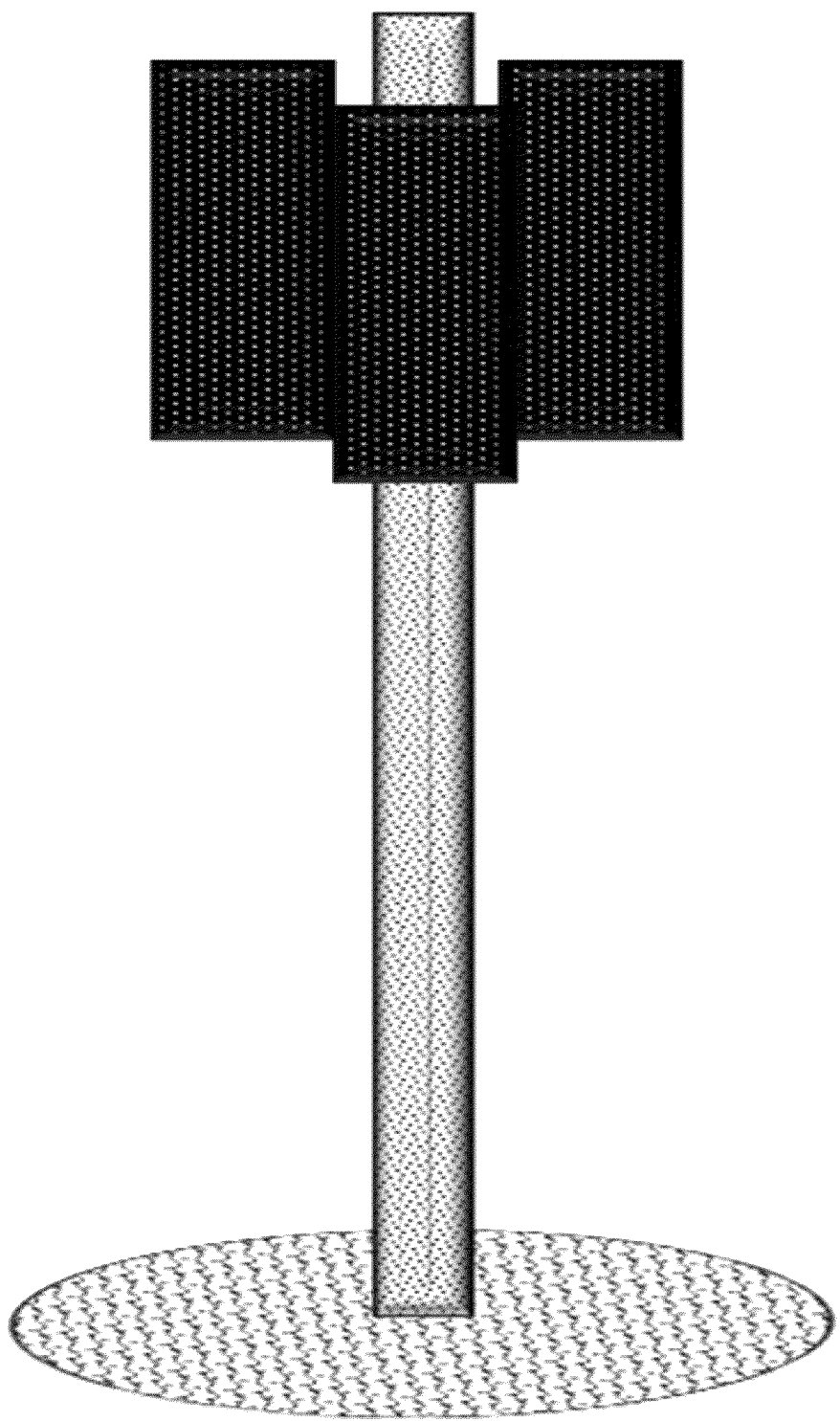
FIG. 9 illustrates a reduced point cloud before ground level points are removed.

In step 4, 3D structure extraction unit 102 filters out the ground just under the cell tower. The "ground" points are illustrated in FIG. 9. More specifically, 3D structure extraction unit 102 filters out the ground using the countLE values from the table above. From the total set of M points, those with $$\frac{\text{count } IN}{N} > \gamma,$$

Figure 10:
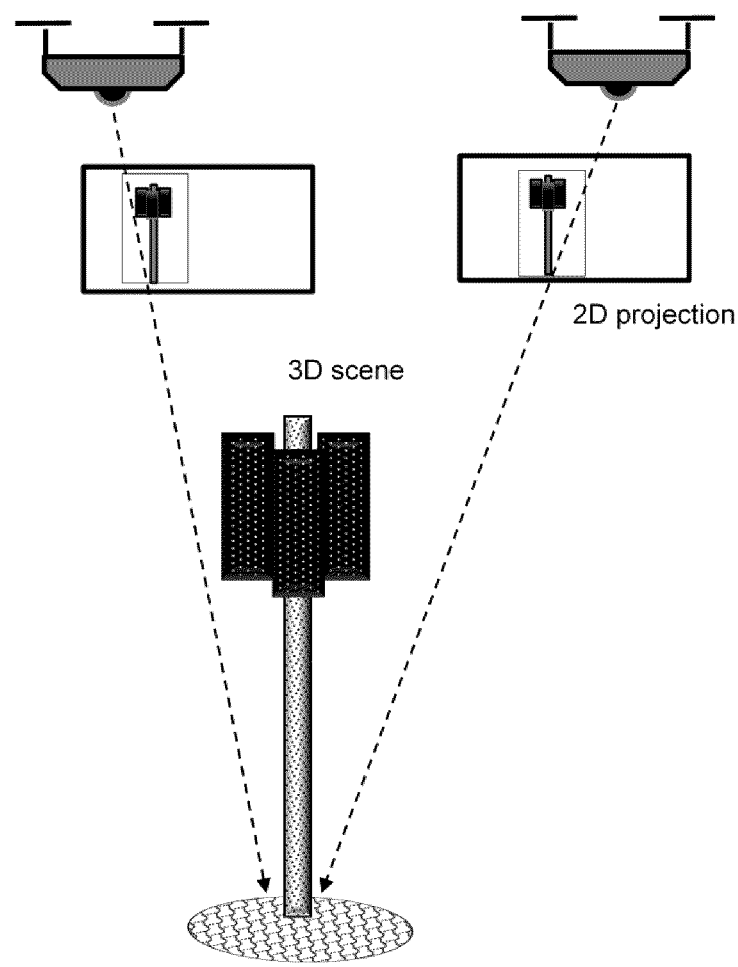
FIG. 10 illustrates how points projected in the vicinity of the lower edge of the BB belong to the ground under the cell tower.

($\gamma$=0.95) are extracted and form a set to be used for estimation of the ground plane (see, e.g., FIG. 10). FIG. 10 illustrates that a dominant plain is calculated for the set of points by using, for example, a Random Sample Consensus (RANSAC) based plane estimator.

A homogenous least square problem is solved using Singular Value Decomposition (SVD) and use RANSAC to iteratively find the dominant plane.

As an example, a point-normal form of a plane equation with coefficient {a, b, c} and centroid {$X_0$, $Y_0$, $Z_0$}:

$$a(X-X_0)+b(Y-Y_0)+c(Z-Z_0)=0$$

could be used to fit a plane to a set of points $\{X_j, Y_j, Z_j\}_{j=1}^{J}$ in a 3D space by minimizing $$f(a, b, c) = \sum_j \frac{|a(X_j - X_0) + b(Y_j - Y_0) + c(Z_j - Z_0)|^2}{(a^2 + b^2 + c^2)}.$$

With the matrix notation $B^T$=[a b c] and $$D = \begin{bmatrix} X_1 - X_0 & Y_1 - Y_0 & Z_1 - Z_0 \\ X_2 - X_0 & Y_2 - Y_0 & Z_2 - Z_0 \\ & \cdot & \\ & \cdot & \\ X_J - X_0 & Y_J - Y_0 & Z_J - Z_0 \end{bmatrix}$$

this is equivalent to minimizing $$f(a, b, c) = \frac{B^T (D^T D) B}{B^T B}.$$

f(a, b, c) is minimized by the eigen vector of $D^T D$ that corresponds to its smallest eigen value. This is solved by calculating the SVD of $D^T D$. RANSAC is used with minimum samples=3 and a threshold $\phi$, e. g. 1.0, to get rid of outliers, and this gives a dominant plane closer to the lower edge of bounding box. Finally, all points on the plane are then removed from the initial point cloud. After the background points and these points on the plane are removed from the initial point cloud, a reduced point cloud is generated (see, e.g., FIG. 5).

Figure 12:
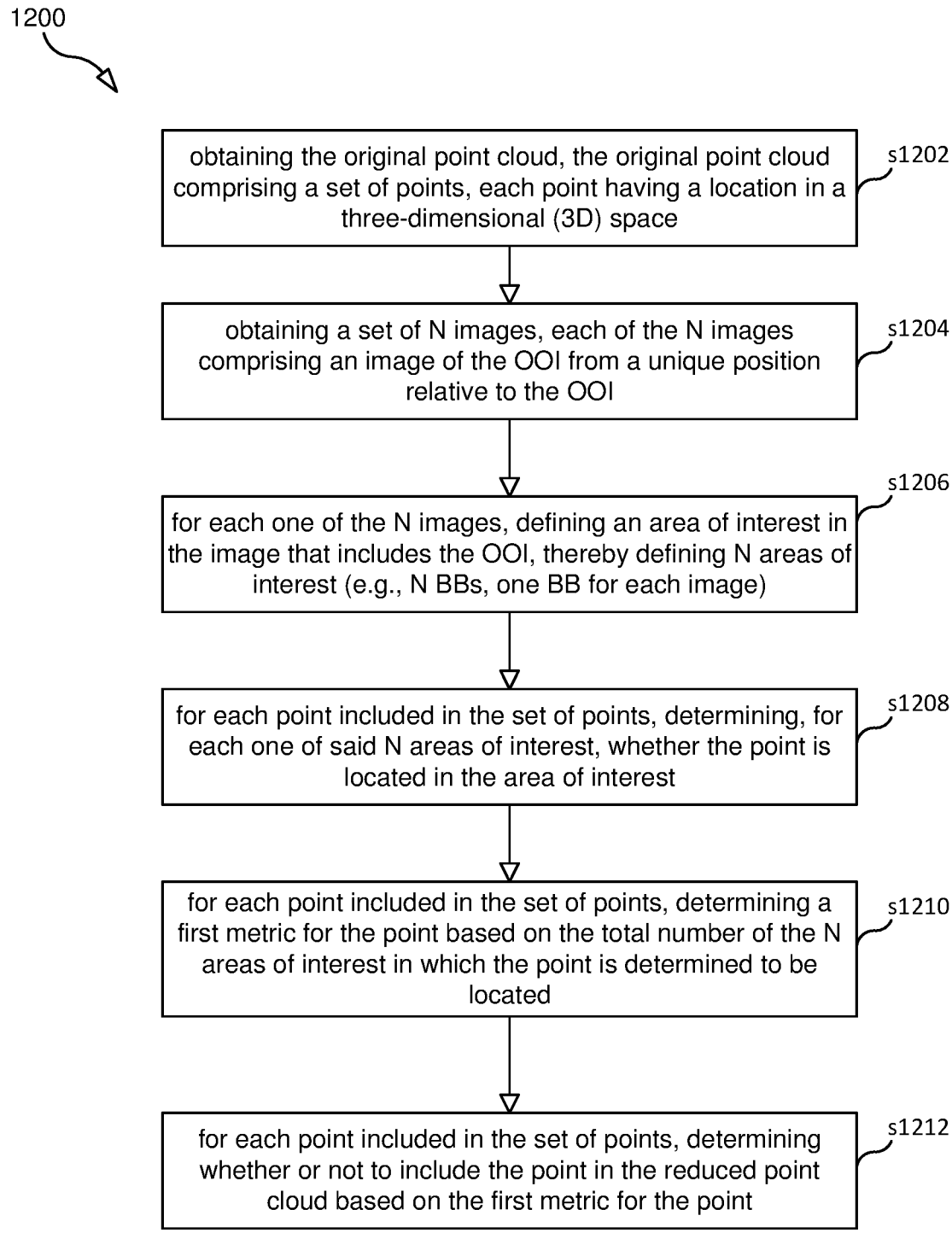
FIG. 12 is a flowchart illustrating a process according to some embodiments.

FIG. 12 is a flowchart illustrating a process 1200, according to some embodiments, for producing a reduced point cloud comprising an OOI (i.e., comprising points corresponding to the OOI (e.g., a cell tower)) from an original point cloud comprising the OOI. Process 1200 may begin in step s1202.

Step s1202 comprises obtaining the original point cloud, the original point cloud comprising a set of points, each point having a location in a three-dimensional (3D) space (i.e., each point is a 3D point).

Step s1204 comprises obtaining a set of N images, each of the N images comprising an image of the OOI from a unique position relative to the OOI. In some embodiments, the step of obtaining the N images comprises flying an aerial vehicle equipped with a camera on a path that circles the OOI, and, while the drone is flying on the path, operating the camera to obtain the N images. In some embodiments the aerial vehicle is an unmanned aerial vehicle (UAV) (a.k.a., a drone).

Step s1206 comprises, for each one of the N images, defining an area of interest in the image that includes the OOI, thereby defining N areas of interest (e.g., N BBs, one BB for each image).

Step s1208 comprises, for each point included in the set of points, determining, for each one of the N areas of interest, whether the point is located in the area of interest.

Step s1210 comprises, for each point included in the set of points, determining a first metric for the point based on the total number of the N areas of interest in which the point is determined to be located.

Step s1212 comprises, for each point included in the set of points, determining whether or not to include the point in the reduced point cloud based on the first metric for the point.

In some embodiment process 1200 further includes, for each point included in the set of points, determining whether the first metric for the point satisfies a first threshold condition and adding the point to the reduced point cloud as a result of determining that the first metric for the point satisfies the first threshold condition. In some embodiments determining the first metric (m1) for a particular point included in the set of points comprises calculating m1=Cin/N, where Cin (a.k.a., CountIN) is a value equal to the total number of the N areas of interest in which the particular point is determined to be located, and determining whether m1 satisfies the first threshold condition comprising determining whether m1 is greater than a threshold, T (e.g., T=0.85).

In some embodiment process 1200 further includes, for each point included in the reduced point cloud, determining, for each one of the N areas of interest, whether the point is within a threshold distance of a lower edge of the area of interest. In some embodiments process 1200 further includes: a) for each point included in the reduced point cloud, determining a second metric for the point based on the total number of the N areas of interest for which the point is determined to be within the threshold distance of the lower edge of the area of interest; b) for each point included in the reduced point cloud for which the second metric satisfies a threshold condition, using the point to determine a plane; and c) removing from the reduced point cloud all of the points in the reduce point cloud that are positioned below the determined plane.

In some embodiments the step of determining whether a point is located in the area of interest corresponding to one of the N images comprises: obtaining 3D location information specifying the location of the point in the 3D space (obtaining the points X, Y, and Z coordinates); obtaining camera pose information identifying a camera pose associated with the one of the N images; obtaining intrinsic camera information, the intrinsic camera information comprising focal length information identifying a focal length; based on the 3D location information, the camera pose information, and the intrinsic camera information, obtaining two-dimensional (2D) location information (e.g., a u* coordinate and a v* coordinate) indicating the location of the point in the one of the N images (see, e.g., equation (Eq.) 3 above); and using the obtained 2D location information to determine whether the point is within the area of interest corresponding to the one of the N images. In some embodiments, the area of interest has a center point located at the coordinates Cu and Cv, the area of interest has a width of W, the area of interest has a height of H, the 2D location information consists of a pair of coordinates u,v, and the step of using the obtained 2D location information to determine whether the point is located within the area of interest comprises: determining if $|Cu-u| \leq W/2$; and determining if $|Cv-v| \leq H/2$.

Figure 13:
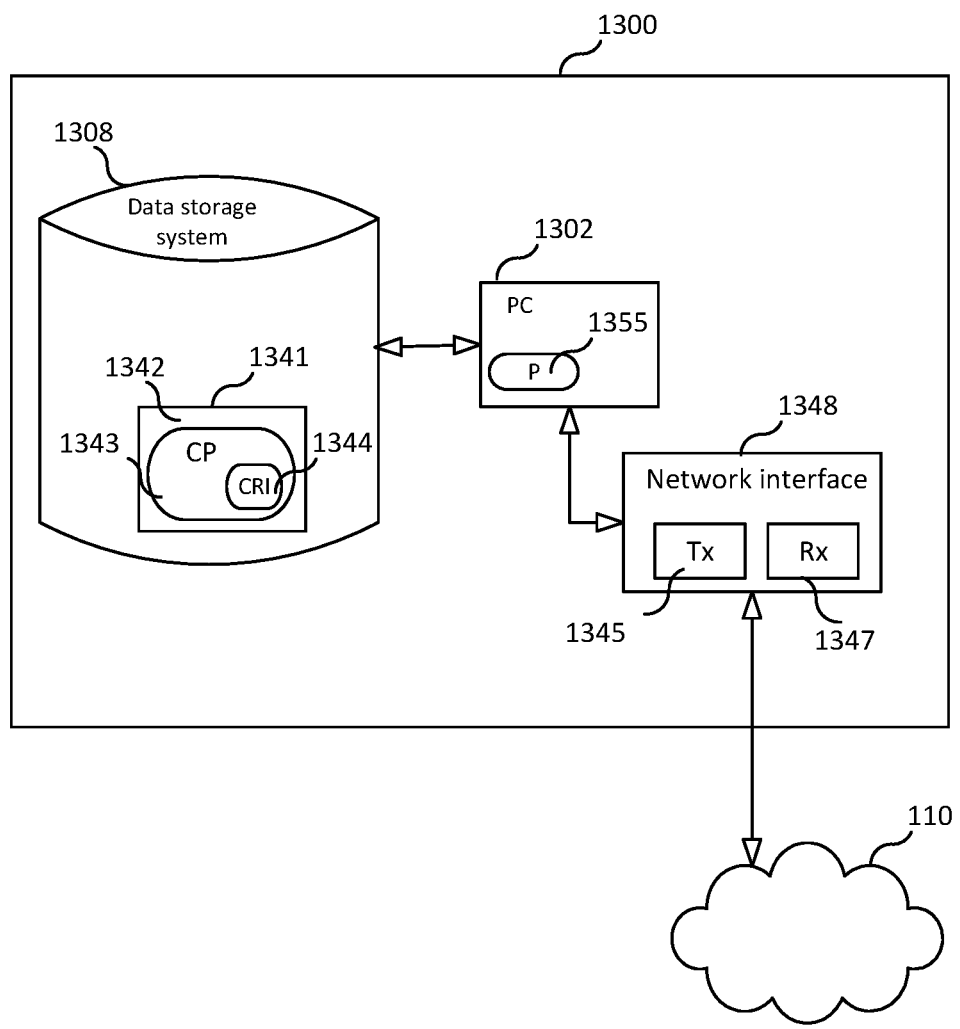
FIG. 13 is a block diagram of a 3D modelling apparatus according to some embodiments.

FIG. 13 is a block diagram of a modeling apparatus 1300, according to some embodiments, for performing the methods disclosed herein. As shown in FIG. 13, apparatus 1300 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1300 may be a distributed computing apparatus); at least one network interface 1348 comprising a transmitter (Tx) 1345 and a receiver (Rx) 1347 for enabling apparatus 1300 to transmit data to and receive data from other nodes connected to a network 110 (e.g., an Internet Protocol (IP) network) to which network interface 1348 is connected (directly or indirectly) (e.g., network interface 1348 may be wirelessly connected to the network 110, in which case network interface 1348 is connected to an antenna arrangement); and a storage unit (a.k.a., "data storage system") 1308, which may include one or more non-volatile storage devices and/or one or more volatile storage devices.

In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI 1344 causes apparatus 1300 to perform steps described herein (e.g., steps described herein with reference to the flow charts). In other embodiments, apparatus 1300 may be configured to perform steps described herein without the need for code. That is, for example, PC 1302 may consist merely of one or more ASICs. Hence, the features of the embodiments described herein may be implemented in hardware and/or software. Accordingly, in one aspect there is provided a computer program 1343 comprising instructions 1344, which, when executed by processing circuitry of a modeling apparatus, cause the modeling apparatus to perform, for example, the above described method for producing a reduced point cloud comprising an OOI from an original point cloud comprising the OOI. In one embodiment, there is provided a carrier containing the computer program 1343, wherein the carrier is one of an electronic signal, an optical signal, a radio signal, and a computer readable storage medium 1342.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for producing a reduced point cloud comprising an object of interest (OOI) from an original point cloud comprising the OOI, the method comprising:
   obtaining the original point cloud, the original point cloud comprising a set of points, each point having a location in a three-dimensional (3D) space;
   obtaining a set of N images, each of the N images comprising an image of the OOI from a unique position relative to the OOI;
   for each one of the N images, defining an area of interest in the image that includes the OOI, thereby defining N areas of interest;
   for each point included in the set of points, determining, for each one of the N areas of interest, whether the point is located in the area of interest;
   for each point included in the set of points, determining the total number of the N areas of interest in which the point is determined to be located;
   for each point included in the set of points, determining a first metric for the point based on the determined total number of the N areas of interest in which the point is determined to be located; and
   for each point included in the set of points, determining whether or not to include the point in the reduced point cloud based on the first metric for the point.

2. The method of claim 1, further comprising:
   for each point included in the set of points, determining whether the first metric for the point satisfies a first threshold condition and adding the point to the reduced point cloud as a result of determining that the first metric for the point satisfies the first threshold condition.

3. The method of claim 2, wherein
   determining the first metric, m1, for a particular point included in the set of points comprises calculating m1=Cin/N, where Cin is a value equal to the total number of the N areas of interest in which the particular point is determined to be located, and
   determining whether m1 satisfies the first threshold condition comprising determining whether m1 is greater than a threshold.

4. The method of claim 1, further comprising:
   for each point included in the reduced point cloud, determining, for each one of the N areas of interest, whether the point is within a threshold distance of a lower edge of the area of interest.

5. The method of claim 4, further comprising:
   for each point included in the reduced point cloud, determining a second metric for the point based on the total number of the N areas of interest for which the point is determined to be within the threshold distance of the lower edge of the area of interest;
   for each point included in the reduced point cloud for which the second metric satisfies a threshold condition, using the point to determine a plane; and removing from the reduced point cloud all of the points in the reduce point cloud that are positioned below the determined plane.

6. The method of claim 1, wherein the step of determining, for each one of the N areas of interest, whether the point is located in the area of interest comprises:
obtaining 3D location information specifying the location of the point in the 3D space;
obtaining camera pose information identifying a camera pose associated with the one of the N images;
obtaining intrinsic camera information, the intrinsic camera information comprising focal length information identifying a focal length;
based on the 3D location information, the camera pose information, and the intrinsic camera information, obtaining two-dimensional (2D) location information indicating the location of the point in the one of the N images; and
using the obtained 2D location information to determine whether the point is within the area of interest corresponding to the one of the N images.

7. The method of claim 6, wherein
the area of interest has a center point located at the coordinates Cu and Cv,
the area of interest has a width of W,
the area of interest has a height of H,
the 2D location information consists of a pair of coordinates u,v,
the step of using the obtained 2D location information to determine whether the point is within the area of interest corresponding to the one of the N images comprises:
determining if |Cu−u|≤W/2; and
determining if |Cv−v|≤H/2.

8. The method of claim 1, wherein the step of obtaining the set of N images comprises flying an aerial vehicle equipped with a camera on a path that circles the OOI, and, while the aerial vehicle is flying on the path, operating the camera to obtain the N images.

9. The method of claim 8, wherein the aerial vehicle is an unmanned aerial vehicle, UAV.

10. A non-transitory computer readable storage medium storing a computer program comprising instructions which when executed by processing circuitry of a modeling apparatus causes the modeling apparatus to perform the method of claim 1.

11. A modeling apparatus, the modeling apparatus comprising:
processing circuitry; and
a memory, the memory containing instructions executable by the processing circuitry, wherein the modeling apparatus is configured to perform a method for producing a reduced point cloud comprising an object of interest (OOI) from an original point cloud comprising the OOI, the method comprising:
obtaining the original point cloud, the original point cloud comprising a set of points, each point having a location in a three-dimensional (3D) space;
obtaining a set of N images, each of the N images comprising an image of the OOI from a unique position relative to the OOI;
for each one of the N images, defining an area of interest in the image that includes the OOI, thereby defining N areas of interest;
for each point included in the set of points, determining, for each one of the N areas of interest, whether the point is located in the area of interest;
for each point included in the set of points, determining the total number of the N areas of interest in which the point is determined to be located;
for each point included in the set of points, determining a first metric for the point based on the determined total number of the N areas of interest in which the point is determined to be located; and
for each point included in the set of points, determining whether or not to include the point in the reduced point cloud based on the first metric for the point.

12. The modeling apparatus of claim 11, wherein the method further comprises:
for each point included in the set of points, determining whether the first metric for the point satisfies a first threshold condition and adding the point to the reduced point cloud as a result of determining that the first metric for the point satisfies the first threshold condition.

13. The modeling apparatus of claim 12, wherein
determining the first metric, m1, for a particular point included in the set of points comprises calculating m1=Cin/N, where Cin is a value equal to the total number of the N areas of interest in which the particular point is determined to be located, and
determining whether m1 satisfies the first threshold condition comprising determining whether m1 is greater than a threshold.

14. The modeling apparatus of claim 11, wherein the method further comprises:
for each point included in the reduced point cloud, determining, for each one of the N areas of interest, whether the point is within a threshold distance of a lower edge of the area of interest.

15. The modeling apparatus of claim 14, wherein the method further comprises:
for each point included in the reduced point cloud, determining a second metric for the point based on the total number of the N areas of interest for which the point is determined to be within the threshold distance of the lower edge of the area of interest;
for each point included in the reduced point cloud for which the second metric satisfies a threshold condition, using the point to determine a plane; and
removing from the reduced point cloud all of the points in the reduce point cloud that are positioned below the determined plane.

16. The modeling apparatus of claim 11, wherein the step of determining, for each one of the N areas of interest, whether the point is located in the area of interest comprises:
obtaining 3D location information specifying the location of the point in the 3D space;
obtaining camera pose information identifying a camera pose associated with the one of the N images;
obtaining intrinsic camera information, the intrinsic camera information comprising focal length information identifying a focal length;
based on the 3D location information, the camera pose information, and the intrinsic camera information, obtaining two-dimensional (2D) location information indicating the location of the point in the one of the N images; and
using the obtained 2D location information to determine whether the point is within the area of interest corresponding to the one of the N images.

17. The modeling apparatus of claim 16, wherein
the area of interest has a center point located at the coordinates Cu and Cv, the area of interest has a width of W,
the area of interest has a height of H,
the 2D location information consists of a pair of coordinates u,v,
the step of using the obtained 2D location information to determine whether the point is within the area of interest corresponding to the one of the N images comprises:
determining if $|Cu-u| \leq W/2$; and
determining if $|Cv-v| \leq H/2$.

18. The modeling apparatus of claim 11, wherein the step of obtaining the set of N images comprises flying an aerial vehicle equipped with a camera on a path that circles the OOI, and, while the aerial vehicle is flying on the path, operating the camera to obtain the N images.

19. The modeling apparatus of claim 18, wherein the aerial vehicle is an unmanned aerial vehicle, UAV.

* * * * *